W. H. STERNS.
POWER-CHURNS.

No. 190,257.          Patented May 1, 1877.

WITNESSES:
E. Wolff.
J. H. Scarborough.

INVENTOR:
W. H. Sterns.
BY
ATTORNEYS.

UNITED STATES PATENT OFFICE.

WILLIAM H. STERNS, OF HUMBOLDT, NEBRASKA.

IMPROVEMENT IN POWER-CHURNS.

Specification forming part of Letters Patent No. 190,257, dated May 1, 1877; application filed February 26, 1877.

*To all whom it may concern:*

Figure 1:
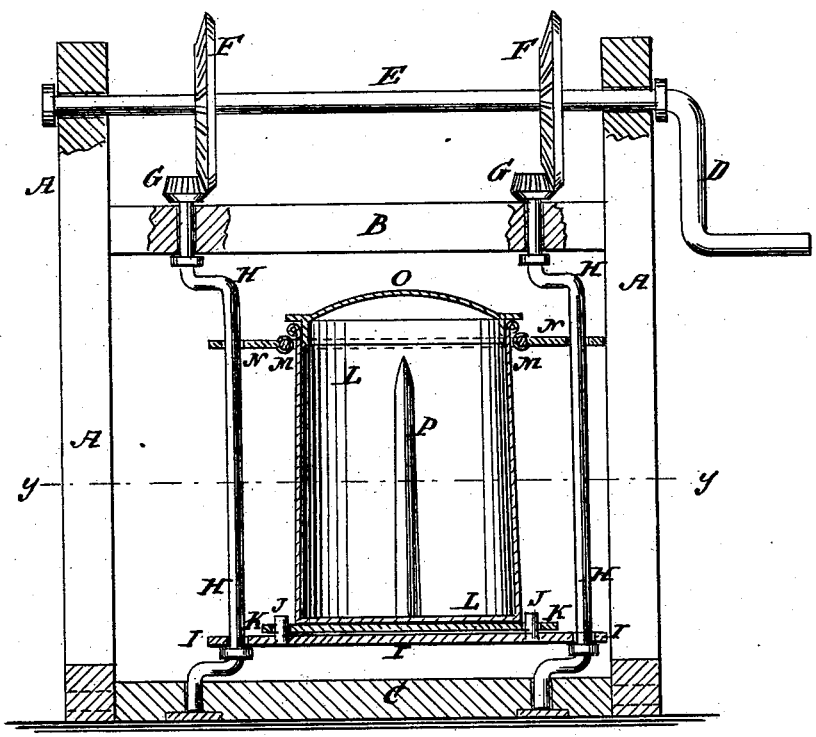
Figure 2:
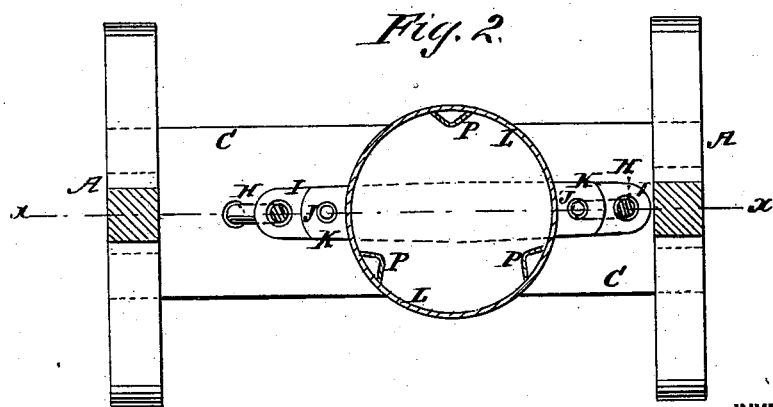

Be it known that I, WILLIAM H. STERNS, of Humboldt, in the county of Richardson and State of Nebraska, have invented a new and useful Improvement in Churning Apparatus, of which the following is a specification:

Figure 1 is a vertical section of my improved churning apparatus, taken through the line $xx$, Fig. 2. Fig. 2 is a horizontal section of the same, taken through the line $yy$, Fig. 1.

Similar letters of reference indicate corresponding parts.

The object of this invention is to furnish an improved churning apparatus which shall be simple in construction, inexpensive in manufacture, convenient in use, easily operated, and effective in operation.

The invention will first be described in connection with the drawing, and then pointed out in the claim.

A B C is an upright frame, formed of two posts, A, connected near their upper ends by a cross-bar, B, and at their lower ends by a cross-bar, C, which is made wide to serve as a platform for the machine. D is the crank, which is formed upon or attached to the end of the shaft E. The shaft E revolves in bearings in the upper ends of the posts A, and to it are attached two large bevel-gear wheels, F, the teeth of which mesh into the teeth of two small bevel-gear wheels, G, attached to the upper ends of the shafts H. The shafts H revolve in bearings in the cross-bars B C, and each of which, near each of said cross-bars, is bent twice at right angles, thus forming two long cranks. The lower parts of the long cranks of the shafts H pass through holes in the ends of the cross-bar I, to which, near its ends, are attached two pins, J, to enter holes in the projecting ends of the bar K, attached to the bottom of the churn-body L. Around the upper part of the churn-body L is passed a ring, M, upon the opposite sides of which are formed lugs N, through which the upper parts of the long cranks of the shafts H pass. The churn-body L is made tapering, so that the ring M cannot slip down too low upon it, and is provided with a closely-fitting cover, O. To the inner surface of the churn-body L are attached longitudinal ribs P, which are tapered to correspond with the taper of the said churn-body.

By this construction, by turning the crank D, the churn-body will be carried around through the arc of a circle, which will throw the milk contained in said churn-body into violent agitation, bringing the butter in a very short time, the ribs P breaking up the circular currents that would otherwise be formed in the milk, and thus greatly increasing the agitation.

Having thus described my invention, I claim as new and desire to secure by Letters Patent—

The combination, with the churn L, of lugged ring N M, pin-bar J I, apertured bar K, and crank-shafts H H, substantially as and for the purpose specified.

WILLIAM H. STERNS.

Witnesses:
W. H. HAY,
E. A. LOPER.